US008060677B2

(12) United States Patent
Rostan et al.

(10) Patent No.: US 8,060,677 B2
(45) Date of Patent: Nov. 15, 2011

(54) REAL-TIME INDUSTRIAL ETHERNET ETHERCAT COMMUNICATION CONTROL

(75) Inventors: Martin Rostan, Nürnberg (DE); YanQiang Liu, Beijing (CN); Ji Huan, Beijing (CN); Wenlei Xiao, Beijing (CN)

(73) Assignee: Beckhoff Automation, GmbH, Verl (DE)

( * ) Notice: Subject to any disclaimer, the term of this patent is extended or adjusted under 35 U.S.C. 154(b) by 0 days.

(21) Appl. No.: 12/704,023

(22) Filed: Feb. 11, 2010

(65) Prior Publication Data
US 2010/0241773 A1 Sep. 23, 2010

Related U.S. Application Data

(63) Continuation of application No. PCT/EP2008/060639, filed on Aug. 13, 2008.

(30) Foreign Application Priority Data

Aug. 15, 2007 (CN) .......................... 2007 1 0120312

(51) Int. Cl.
*G06F 13/42* (2006.01)
(52) U.S. Cl. ....................................... 710/105; 710/110
(58) Field of Classification Search ............... 710/10, 710/19, 20, 24, 104–106, 110, 305
See application file for complete search history.

(56) References Cited

U.S. PATENT DOCUMENTS

| | | | | |
|---|---|---|---|---|
| 7,657,330 B2 * | 2/2010 | Morrison | ......................... | 700/19 |
| 7,668,994 B2 * | 2/2010 | Albrecht et al. | .............. | 710/110 |
| 7,746,883 B2 * | 6/2010 | Erickson et al. | .............. | 370/419 |
| 2005/0114577 A1 * | 5/2005 | Beckhoff et al. | ............. | 710/110 |
| 2006/0161705 A1 * | 7/2006 | Schultze et al. | .............. | 710/106 |

(Continued)

FOREIGN PATENT DOCUMENTS

DE 200 23 360 U1 12/2003

(Continued)

OTHER PUBLICATIONS

Janssen, D. et al. "EtherCAT—Der Ethernet-Feldbus Funktionsweise und Eigenschaften—1. Teil," Elektronik, WEKA Fachzeitschriftenverlag, Poing, Germany, 52(23): 64, 66-72 (Nov. 11, 2003). XP001177407.

Janssen, D. et al. "Ethernet field bus. Part 2," Elektronik, WEKA Fachzeitschriftenverlag, Poing, Germany, 52(25): 62-67 (Dec. 9, 2003). XP001538791.

(Continued)

*Primary Examiner* — Khanh Dang
(74) *Attorney, Agent, or Firm* — Dorsey & Whitney LLP

(57) ABSTRACT

A real-time industrial Ethernet EtherCAT system including a communication master and a plurality of slave nodes, wherein one slave node acts as a logic control master and the further slave nodes act as logic control slaves, and wherein a communication flow is as follows: the communication master sends a data fetching frame, when the data fetching frame passes through the logic control master, the logic control master inputs control data for the logic control slaves into the data fetching frame, when the data fetching frame passes through the logic control slaves, each logic control slave inputs status data into the data fetching frame, after return of the data fetching frame to the communication master, the communication master sends a data sending frame with output data, said output data being reorganized according to the control relationship between the logic control master and the logic control slaves by the communication master, when the data sending frame passes through the logic control master, the logic control master gets the status data of the logic control slaves from the data sending frame, and when the data sending frame passes through the logic control slaves, each logic control slave gets command data from data sending frame.

6 Claims, 2 Drawing Sheets

U.S. PATENT DOCUMENTS

2006/0274746 A1* 12/2006 Kuschke et al. ............... 370/389
2007/0055391 A1* 3/2007 Schneider et al. ............... 700/28
2007/0192449 A1* 8/2007 Schultze et al. ............... 709/220

FOREIGN PATENT DOCUMENTS

EP  1 075 110 A  2/2001

OTHER PUBLICATIONS

Tuerke, C. "Interbus-S in der Regelschleife. Datentransfer von Slave zu Slave macht's moglich," Elektronik, WEKA Fachzeitschriftenverlag, Poing, Germany, 44(12): 79, 81-84 (Jun. 13, 1995). XP000515422.

* cited by examiner

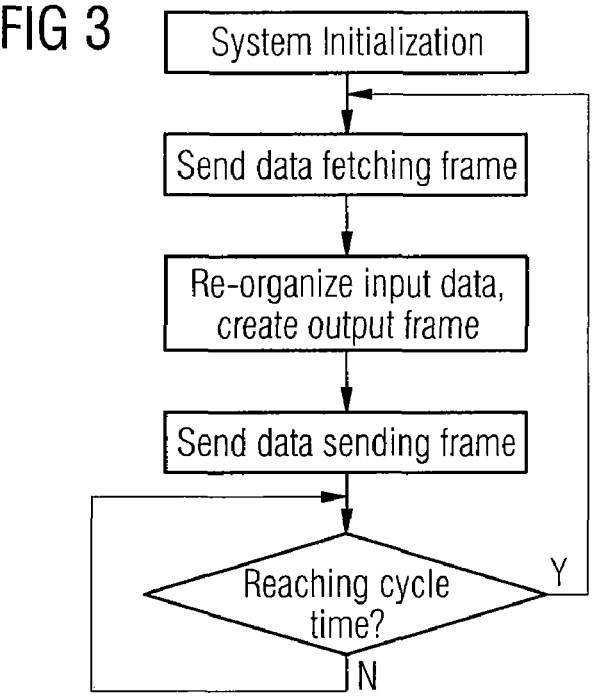
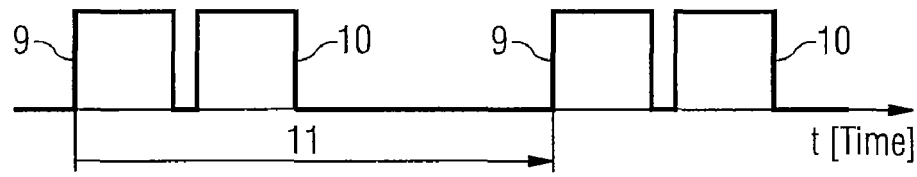
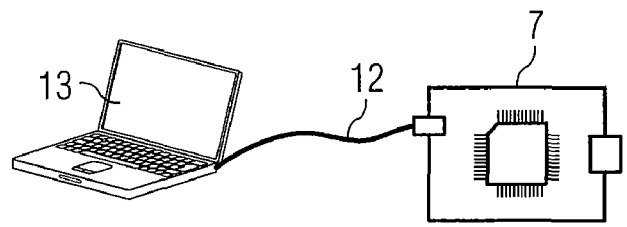
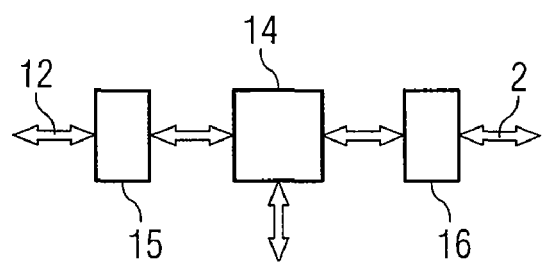

REAL-TIME INDUSTRIAL ETHERNET ETHERCAT COMMUNICATION CONTROL

CROSS-REFERENCE TO RELATED APPLICATIONS

This application is a continuation of PCT Application No. PCT/EP2008/060639 filed Aug. 13, 2008, which claims priority to Chinese Patent Application No. 200710120312.6, filed Aug. 15, 2007. The entire content of both applications is hereby incorporated by reference.

FIELD

The present invention relates to a method for operating a real-time industrial Ethernet EtherCAT system, used in industrial automation fields.

BACKGROUND

EtherCAT is a real-time industrial Ethernet technology particularly suitable for communication between control systems and peripheral devices like I/O systems, drives, sensors and actuators. It is part of the IEC1158 and the IEC61800 standard.

An EtherCAT system comprises a master and some slaves. Conventionally, the master plays the role of both a communication master and a control master. This makes the master code very complex and special technology must be introduced for achieving the expected fast communication speed.

SUMMARY

One embodiment of the present invention provides a method for operating a real-time industrial Ethernet EtherCAT system comprising a communication master and a plurality of slave nodes, wherein one slave node acts as a logic control master and the further slave nodes act as logic control slaves. A communication flow is as follows: The communication master sends a data fetching frame. When the data fetching frame passes through the logic control master, the logic control master inputs control data for the logic control slaves into the data fetching frame. When the data fetching frame passes through the logic control slaves, each logic control slave inputs status data into the data fetching frame. After return of the data fetching frame to the communication master, the communication master sends a data sending frame with output data, said output data being reorganized according to the control relationship between the logic control master and the logic control slaves by the communication master. When the data sending frame passes through the logic control master, the logic control master gets the status data of the logic control slaves from the data sending frame. When the data sending frame passes through the logic control slaves, each logic control slave gets command data from the data sending frame.

Another embodiment of the present invention provides a real-time industrial Ethernet EtherCAT system comprising a communication master and a plurality of slave nodes. One slave node acts as a logic control master and the further slave nodes act as logic control slaves. A master communication cycle contains two EtherCAT frames, one being defined as a data fetching frame and the other as a data sending frame. The logic control slaves input status data into the data fetching frame. The communication master reads the data fetching frame and maps the input data to output data according to a communication relationship between the slave nodes and sends the output data to the slave nodes by means of the data sending frame The logic control master gets status data of the logic control slaves from the data sending frame.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit other equally effective embodiments.

FIG. 3 shows a data flow chart according to the present invention.

FIG. 4 shows a data fetching and sending cycle chart according to the present invention.

FIG. 5 shows a sketch for configuring a communication controller by PC via USB according to the present invention.

FIG. 6 shows an architecture of a communication controller according to the present invention.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
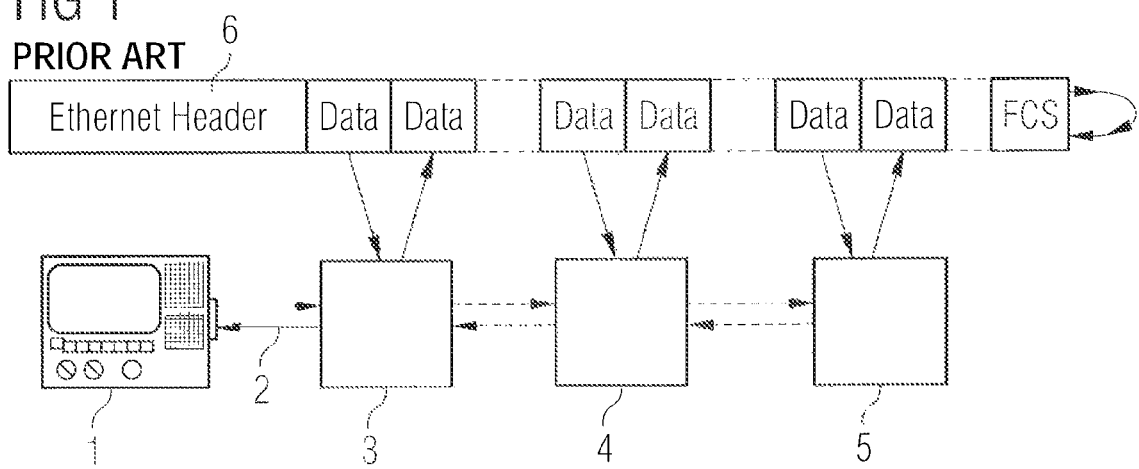
FIG. 1 shows the principles of an EtherCAT operation.

FIG. 1 shows an architecture of an EtherCAT system comprising a master 1 such as a PC with 100 Mb/s Ethernet interface, a cable 2 and slave nodes 3,4,5 such as ESCs (EtherCAT Slave Controller). Conventionally, the PC master plays the role of both a communication master and a control master. This makes the master code very complex and special technology must be introduced for achieving the expected fast communication speed.

Figure 2:
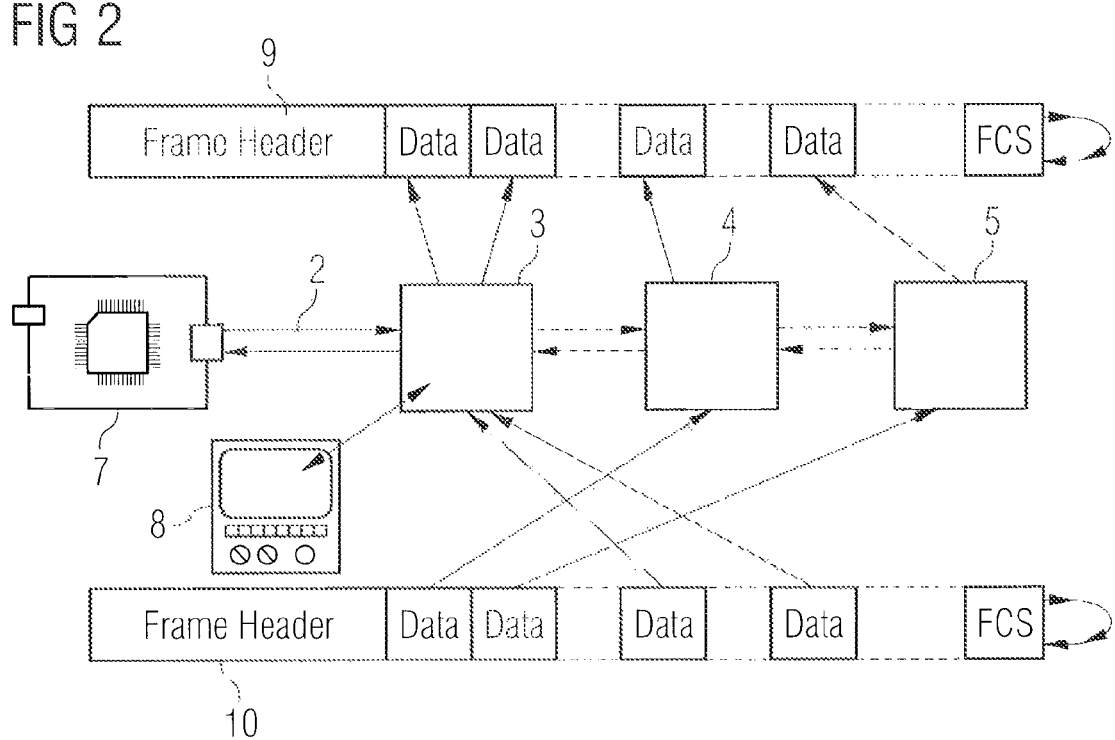
FIG. 2 shows an EtherCAT operation according to the present invention.

As shown in FIG. 2, according to the present invention an EtherCAT system comprises a communication controller 7 acting as a communication master and the slave nodes 3, 4, 5, wherein one slave node 3 acts as a logic control master and the further slave nodes 4, 5 act as logic control slaves. The communication controller 7 contains a corresponding computer program.

FIG. 6 shows an architecture of the communication controller hardware. It comprises a microprocessor 14 with a 100 Mb/s Ethernet and an integrated USB function, an Ethernet interface circuitry 16, an USB interface circuitry 15, a FLASH memory 17 and other peripheral components. The microprocessor is the central component for function implementation. The communication controller is connected with the slaves via the Ethernet cable 2 and is connected with a PC 13 via a USB cable 12.

FIG. 5 shows the PC 13 configuring the communication controller 7 via the USB cable 12. Configuration data includes a cycle time, a definition of slave nodes as logical control master and logical slave, corresponding data addresses and a length of the frame and are stored in the FLASH memory of the controller.

The communication controller 7 manages the data flow of the communication, as shown in FIG. 2. The communication controller 7 initiates and controls the data frame transmitting within the system. The slave 3 is defined as the logic control master which is managed by a control unit 8. The slaves 4 and 5 are defined as the logic control slaves. A communication cycle contains frames 9 and 10. The communication flow is as follows:

1. The controller 7 sends a data fetching frame 9. When frame 9 passes through the node 3, the logic control master inputs control data for the logic control slaves into the frame. When the frame 9 passes through the nodes 4 and 5, the logic control slaves input their status data into the frame.
2. After the return of the frame to the controller, the frame is reorganized to form output data according to a control relationship between logic control master and logic control slaves.
3. The controller sends the data sending frame 10 with the output data. When the frame 10 passes through the node 3, the logic control master gets the status data of the logic control slaves from the specified datagram of the frame. When the frame 10 passes through the nodes 4 and 5, every logic control slave gets the command data from the specified datagram of the frame.

FIG. 3 illustrates the software flow chart of the data fetching and sending cycle. It runs with a cycle time 11 as shown in FIG. 4, which can be 0.1 to 10 milliseconds, depending on the control task and the associated nodes.

The present invention provides a microprocessor-based embedded EtherCAT communication controller, by means of which users can use EtherCAT without the need of developing complicated master communication program, but only simple slave drive programs. The communication controller contains a corresponding computer programs. The communication controller comprises a microprocessor with a 100 Mb/s Ethernet and an integrated USB function, an Ethernet interface circuitry, an USB interface circuitry, a FLASH memory and other peripheral components. The communication controller acts as an EtherCAT master, connecting with slave nodes by a cable. It can be configured offline by a PC via the USB interface. The configuration data are stored in the FLASH memory of the controller The corresponding computer program includes a microprocessor-based EtherCAT master communication program and a PC-based configuration software. The master communication cycle contains two EtherCAT frames; one is defined as a data fetching frame and the other as a data sending frame. The master reads input data from every slave node by means of the data fetching frame and maps the input data to the output data according to a communication relationship between slaves. Then the master sends the output data to slaves with the data sending frame. The slaves are functionally defined as a logic control master or logic control slave. A multi-logic control master system can be implemented. The PC based software can exchange data with the communication controller via the USB interface for configuring the controller and for reading status data. The configuration data includes a cycle time, a definition of slave nodes as the logic control master and logic control slaves, corresponding data addresses and a frame length.

The advantages are: in the first place, the control master can be an embedded control unit, making EtherCAT more useful in non-PC-based control systems. In the second place, EtherCAT can be implemented without detailed EtherCAT knowledge, making EtherCAT development easier.

The components in the Figures are numbered as follows:
1 PC master
2 communication cable
3, 4, 5 slave nodes
6 EtherCAT frame
7 communication controller
8 control unit
9 data fetching frame
10 data sending frame
11 data fetching and sending cycle time
12 USB cable
13 PC computer
14 microprocessor
15 USB interface
16 Ethernet interface
17 FLASH memory

The invention claimed is:

1. A method for operating a real-time industrial Ethernet EtherCAT system comprising:
   sending a data fetching frame from a communication master to a plurality of slave nodes;
   wherein when the data fetching frame passes through one slave node acting as a logic control master, the logic control master inputs control data for the other slave nodes, acting as logic control slaves, into the data fetching frame; and
   when the data fetching frame passes through the logic control slaves, each logic control slave inputs status data into the data fetching frame;
   wherein after return of the data fetching frame to the communication master, the communication master sends a data sending frame with output data, said output data being reorganized according to the control relationship between the logic control master and the logic control slaves by the communication master; and
   wherein when the data sending frame passes through the logic control master, the logic control master gets the status data of the logic control slaves from the data sending frame; and
   when the data sending frame passes through the logic control slaves, each logic control slave gets command data from data sending frame.

2. The method for operating a real-time industrial Ethernet system according to claim 1, wherein the communication master consists of a hardware and a corresponding computer program and is connected with the slave nodes via a cable, wherein the hardware of the communication master comprises a microprocessor with a 100 Mb/s Ethernet and an integrated USB function, an Ethernet interface, a USB interface, a FLASH memory and other peripheral components.

3. The method for operating a real-time industrial Ethernet system according to claim 2, wherein the FLASH memory stores configuration data including a cycle time, a definition of the plurality of slave nodes as the logical control master and the logical control slaves, corresponding data addresses and a length of a data frame.

4. A real-time industrial Ethernet EtherCAT system comprising a communication master and a plurality of slave nodes connected via a cable thereto, wherein one slave node acts as a logic control master and the further slave nodes act as logic control slaves, wherein a master communication cycle contains two EtherCAT frames, one is a data fetching frame and the other is a data sending frame, wherein the logic control slaves input status data into the data fetching frame, wherein the communication master reads the data fetching frame and maps the input data to output data according to a communication relationship between the slave nodes and sends the output data to the slave nodes with the data sending frame, and wherein the logic control master gets status data of the logic control slaves from the data sending frame.

5. The real-time industrial Ethernet system according to claim 4, wherein the communication master consists of a hardware and a corresponding computer program, wherein the hardware of the communication master comprises a microprocessor with a 100 Mb/s Ethernet and an integrated USB function, an Ethernet interface, a USB interface, a FLASH memory and other peripheral components.

6. The real-time industrial Ethernet system according to claim 5, wherein the FLASH memory stores configuration data including a cycle time, a definition of the plurality of slave nodes as the logic control master and the logic control slaves, corresponding data addresses and a length of a data frame.

* * * * *